Figure 3:
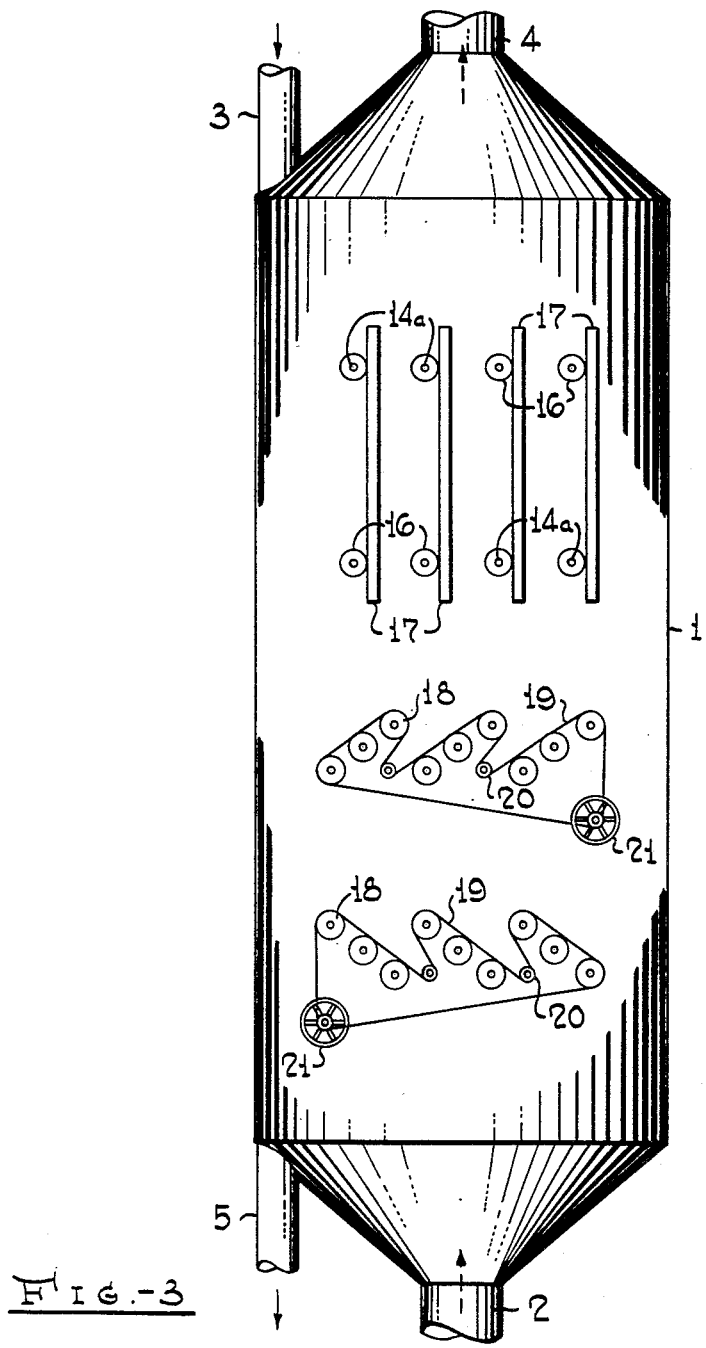

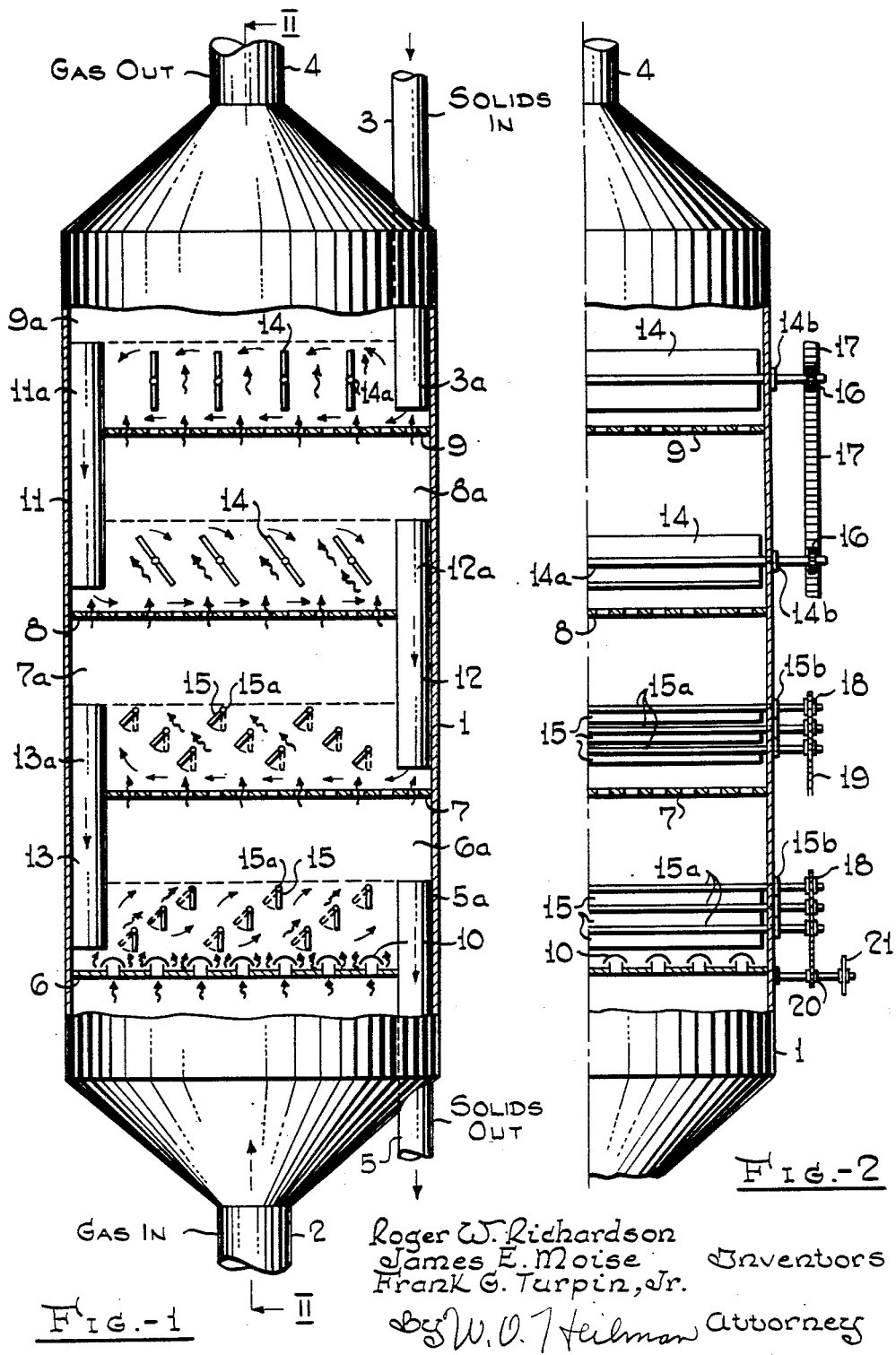

United States Patent Office 2,702,434
Patented Feb. 22, 1955

2,702,434
APPARATUS FOR COUNTERCURRENT CONTACTING OF FLUIDIZED SOLIDS WITH GASEOUS MATERIALS

Roger W. Richardson, James E. Moise, and Frank G. Turpin, Jr., Baton Rouge, La., assignors to Standard Oil Development Company, a corporation of Delaware Application February 6, 1952, Serial No. 270,122

3 Claims. (Cl. 34—57)

The present invention relates to an improved apparatus for contacting vaporous and/or gaseous materials with fluidized, finely divided solid materials. More particularly, the invention relates to such apparatus in which the vaporous and/or gaseous materials are passed upwardly through a series of superimposed contact chambers or zones in a contacting vessel, while the fluidized, finely divided solid materials are passed downwardly therethrough in substantially countercurrent relation to the ascending vapors or gases. With further particularity, the invention relates to an apparatus as employed in a system in which the contacting vessel is a vertical tower substantially equivalent to a bubble tray column including a series of vertically spaced, perforate, transverse plate elements, downcomers from plate to plate, each plate with a vapor space above such layer having a depth as predetermined by the level of the entrance end of the downcomer or the height of the weir. Bubble caps may or may not be associated with the perforations in the respective plate elements. In such a system, the downflowing solid materials are introduced in a fluidized condition and normally are intended to be maintained in such fluidized condition during passage downwardly through the contacting vessel. During such passage, the flow of fluidized solid materials will be laterally over the respective plates, the gaseous materials passing upwardly through the vessel by way of the plate perforations through the layer of solid materials on each plate.

In a conventional apparatus of the type contemplated, if the gaseous material is not properly distributed through the mass of solids on each plate, maintenance of suitable contact between the materials and proper solids flow over the plates may be unfavorably affected. Uneven distribution of gaseous material may not only lower the unit contacting time per plate, and thus require an increase in the tower volume, in order to obtain the total time required, but may also result in loss of fluidity in the solids stream such as to interrupt or impede the flow thereof to an extent which may make the vessel inoperable. These undesirable conditions may result in spite of adequate means providing for even initial distribution of the streams of gaseous materials as passed through the plates themselves, and is believed to be due to the sweeping action of the solids flow across the individual plates. This sweeping action of the flowing solids tends to deflect laterally the gas streams introduced through the plates and to result in intermingling of the streams to produce enlarged bubbles or pockets of gas to the detriment of efficient gas and solid contact. It also results in a progressive reduction in density of the solids mass moving across the plates from the solids inlet thereto to the solids overflow therefrom. With substantially even initial distribution of gas flow into the mass, the observed density reduction indicates subsequent uneven dispersion of the gas and a tendency toward accumulation in the direction of solids flow.

In a typical instance, the pressure drop of a gas passed through a perforated plate member and the solids density were measured at the solids inlet side of the plate, the center of the plate, and the solids outlet or overflow side. The measurements obtained were as follows:

| | At Solids Inlet Side | At Center of Plate | At Solids Outlet Side |
|---|---|---|---|
| Pressure drop of gas through the plate in inches of water | 6.2 | 6.9 | 6.9 |
| Solids density in lbs./cubic foot | 18.7 | 13.1 | 9.1 |

As indicated by pressure drop through the plate, initial distribution was substantially uniform. As indicated by the density measurements, however, subsequent distribution or dispersion was unbalanced and resulted in the development of a severe density gradient between the inlet and outlet sides of the plate. Under desired optimum conditions, in an operation of the character contemplated, the density of solids on the plate may be substantially between about 12 pounds and about 14 pounds per cubic foot, with a density gradient, or variation from plate inlet to plate outlet of from about 1 pound to about 3 pounds per cubic foot.

It is an object of the present invention to provide means for regulating or controlling the interrelated flow of fluidized finely divided solids across the respective tower plates, and also the dispersion or distribution of gaseous material through the flowing stream or mass of solids. It is also an object of the invention to provide means whereby the degree of contact between the respective materials on each plate or in each contact zone is improved, and the gas stream displacement effect produced by the cross-flow sweeping action of the finely divided solids passing over each plate is substantially minimized. A further object of the invention is to provide means for improving the density gradient characteristics of a stream of fluidized, finely divided, solids flowing laterally over a perforated plate member from an inlet for solids on one side to an outlet for such solids at the other side of said plate, while passing a plurality of streams of gaseous materials vertically upward through said plate perforations into and through the flowing stream of solids.

The invention and its objects may be more fully understood from the following description, when it is read in its relationship to the accompanying drawings, of which Figure 1 is a side elevation, partly in vertical section, showing a contacting tower provided with a vertical series of spaced plate members which divide the tower into a series of superimposed contacting chambers or zones;

Figure 2 is a similar view of a portion of the tower taken along the section line II—II of Figure 1, and in partial vertical section; and Figure 3 is a side elevational view diametrically opposite to that of Figure 1.

Referring to the drawings in greater detail, the numeral 1 designates the shell of a vertically disposed vessel or tower having inlet conduit connections 2 and 3, and outlet conduit connections 4 and 5. The vessel is divided, by means of a vertical series of horizontal plate members, such as 6, 7, 8 and 9, into a plurality of superimposed chambers or compartments 6a, 7a, 8a, and 9a respectively, the members 6, 7, 8 and 9 forming the floor of each compartment. Each plate is perforated, providing a plurality of passageways communicating between the compartments above and below the plate, and, if desired, the passageways may open upwardly through bubble cap elements 10 such as shown in conjunction with the plate member 6 or through any other means forming distribution conduits or passageways for the gaseous material.

The inlet conduit 3 is extended through the upper end of vessel 1, with a discharge end 3a opening into compartment 9a in vertically spaced relation to the plate member 9, while outlet conduit 5 extends downwardly through plate 6, with an entrance end opening from the compartment 6a at a level therein in spaced relation vertically from the plate 6 and above the discharge end of an inlet conduit for the compartment, providing a weir portion 5a above the plate. Conduit connection between compartments is provided by means of downcomer elements 11, 12, and 13 which, for the purpose of illustration, are shown as tubular members extended through the plates 9, 8 and 7 respectively with upper entrance ends terminating above the plate members in vertically spaced relation thereto to provide weir portions 11a, 12a, and 13a and lower discharge end portions terminating below the entrance end of an outlet conduit from the compartment next below, and in substantially close vertically spaced relation to the floor plate thereof. In each compartment, the inlet and outlet conduits are disposed in opposed relation diametrically of the compartment and define opposite ends of a flow path for a layer of fluidized solids laterally across the floor plate thereof. Any other conventional form of downcomer may be substituted for the form as illustrated.

As thus far described, the apparatus is comparable to a conventional structure such as may be used in contacting gaseous materials with finely divided solids in which a fluidized, finely divided solid material might be introduced by way of the inlet conduit 3 onto the plate 9, forming thereon a layer to a depth substantially equal to the level of the weir portion 11a of downcomer 11, through which it overflows to be discharged onto plate 8, forming a similar layer thereon, and thus downwardly through the tower from plate to plate, eventually overflowing the weir portion 5a of outlet conduit 5 to be discharged from the tower. By arrangement of the downcomers alternately, in diametrically opposed relation, the flow of fluidized solids is caused to follow a horizontal path, transversely of each plate. At the same time, a gaseous or vaporous material is introduced into the vessel 1 by way of the inlet conduit 2 and passes upwardly through the passageways provided by the perforations through the plate 6, and bubble caps 10 or other distributor or dispersion means as employed. Under inlet pressure, the gaseous material is dispersed and forced through the layer of solids on the plate in intimate contact with the individual solid particles in the flowing stream of solids thereon. In addition, the gaseous material dispersed and forced through the flowing stream of solids fluidizes the mass of solid particles so as to maintain the liquid flow characteristics thereof. From the chamber 1a the gaseous material is forced successively upwardly through the several plates and chambers above in similar fashion. The column of solids flowing downwardly through each downcomer 11, 12 and 13 provides a substantial seal against by-passing of any chamber.

In such conventional operation, the undesirable conditions previously described may result from the lateral displacement and diversion of the streams of gaseous materials discharged through the respective plate passageways, and subject to the sweeping action of solids flowing across the plates. As shown, therefore, and according to the present invention, each compartment 6a, 7a, 8a, and 9a is provided with a series of baffle members disposed and arranged to regulate and to direct the flow and dispersion of the streams of gaseous materials discharged into the stream of solids flowing across the plates so as to prevent or avoid the undesirable conditions previously set forth.

In Figure 1 two types of baffle members are illustrated and for each type two position arrangements are shown. The baffle members in compartments 9a and 8a are single unit elements 14 disposed laterally of the tower in generally right angular relation to the direction of solids flow across the plates 8 and 9, and in parallel relation one to another, as a series from inlet conduit 3 to downcomer 11 and downcomer 11 to downcomer 12. Also, as shown, the baffles are disposed in edgewise, angular relation to the plate members below. The baffles 14 in compartment 9a are shown as disposed vertically with reference to plate 9 while the baffle members in compartment 8a are shown as inclined obliquely with reference to the plate 8 and from the lower edge adjacent the plate in the direction of downcomer 11, in opposition to the direction of flow across the plate 8. In each of the compartments 7a and 6a the baffle members 15 are disposed in sets of three superimposed staggered rows. In each set the lowermost row of members begins adjacent the downcomer from a plate above with the successive rows of members offset laterally in the direction of flow across the plate, from those in the row next below, the last baffle in the uppermost row being adjacent to the weir portion of the downcomer leading from the compartment to the compartment next below. In the arrangements illustrated, the baffle members 15 in each row of the set disposed in compartment 7a are shown as inclined angularly with reference to the plate 7 toward the downcomer 12 and substantially in opposition to the flow of solids therefrom across the plate 7 toward the weir portion 13a. The set of baffles in the compartment 6a is shown to be arranged with the individual members vertically disposed with reference to the plate member 6.

Although the several baffle members in each compartment may be permanently mounted therein in any suitable or fixed angular relationship to the respective plate members, in the drawings, and with particular reference to Figs. 2 and 3, they are shown as being individually mounted on rotatable shaft members such as shafts 14a in compartments 9a and 8a and shafts 15a in compartments 7a and 6a, each shaft extending outwardly through a wall of the vessel 1 by way of a bearing and seal member 14b and 15b respectively therefor. These shafts are disposed longitudinally of the baffle members with a baffle member secured thereto along a lateral edge thereof, as in compartments 6a and 7a, or intermediate the opposite lateral edge portions of a baffle member as in compartments 8a and 9a. By means of the shaft elements 14a and 15a, the baffles 14 and 15 may be rotated to change the pitch of individual baffles or they may be arranged for rotation in unison in each compartment set or as sets from compartment to compartment. Where individually rotatable, each shaft may be provided with a separate hand wheel, but where rotatable in sets, the shafts may be provided as with pinion gear elements 16, the gears in each set being operated by means such as rack elements 17. Alternately, gear elements 16 may be replaced by sprockets 18, interconnected as by means of chain 19 arranged with idler sprockets 20, and operating means such as hand wheel 21 to provide for simultaneous operation of all baffles in any set. The pinion gears and rack elements, and other possible arrangements for operation, are illustrated in Figs. 2 and 3.

In operation of the apparatus as illustrated in the drawing, the conventional procedure as set forth above for passing fluidized solid materials and gaseous materials through the vessel will be followed in the usual manner substantially as described above. In a typical system, the solids flowing downward through the tower have a particle size below about 200 microns, with at least 50% of the solids having a size of from about 20 to about 80 microns. Fluidity is maintained by the velocity of the upflowing gaseous materials of which the superficial velocity normally will be in the range of from about 0.5 to about 2.0 feet per second. By suitable arrangement of the baffle members, however, the upward flow of gases through the several layers of solid materials on the respective plate members 6, 7, 8 and 9 may be regulated and controlled so as to prevent the sweeping action of the solid materials flowing across each plate from diverting or displacing the flow of gas through the layer and thereby undesirably reducing density of the solids layer in the direction of the respective downcomers.

Preferably, the baffles are installed or disposed and set obliquely at an angle substantially perpendicular to the upward flow direction of solids across the plate, thus providing the maximum surface to redirect the gas flow and permit disengaging of solids and gas.

As illustrated in the drawing, the layer of solid material on each plate will have a depth substantially equal to the height of the weir portion of each downcomer in the manner shown. Also, as illustrated, the flow of solids material across the plate is indicated by straight or curved shafted arrows while the flow of gaseous materials through the plates of the layer of solids on each plate is indicated by sinuous shafted arrows. As thus indicated, the flow of the respective materials is shown to be such that the streams of gaseous materials passing upwardly through the layer of solids may be displaced only to the extent of surface contact with a baffle member, being diverted by the baffle members in an upward direction as compared with the lateral diversion effect of the flowing layer of solid material. Normally, it is intended that the baffle members be of such dimensions and disposition as to be wholly submerged in the layer of solids on each plate with the lower edge portions in spaced relation to a plate below. When the baffles are rotatably mounted as shown, they may be arranged for rotation through an arc of 90° in either direction from a vertical position. Preferably, however, the baffles will be disposed, as also indicated above, so that they will be inclined angularly to the vertical flow of gaseous materials, with the lower edge portions extending toward the downcomer weirs and the upper edge portions toward the discharge ends thereof. In this way, the distribution and control of the gaseous streams flowing through the layer of solids materials on each plate may be regulated as desired so as to obtain more uniformly density and fluidization of the solids materials from the inlet side to the outlet side of the plate. By use of baffles arranged as shown, the effective area of the plate may be divided into a lateral series of sections, the number of sections being determined by the number of baffle members employed and by the degree of control necessary.

It should be understood that the normal sweeping action of the solids carrying the gas across the plate results in operability limitations as well as inefficient contacting of gas and solids. The greater proportion of gas rising at the weir end of the plate, which causes the low density of the solids, limits the amount of gas that can be introduced because of entrainment of solids to the plate above. Likewise the solids rate is limited by the head of low density solids in the weir. The ideal system would consist of uniform vertical gas flow with uniform density of the solids across the plate and only the necessary hydraulic gradient across the plate to maintain the solids flow.

The use of baffles tends to approach this ideal system by forcing the gas upward as a type of straightening vane. At the same time the baffles do not offer too much restriction to the solids flow across the plate since the solids do not move uniformly over the cross section, but tend to shoot diagonally across the plate with the gas. The baffles, therefore, improve operability by providing for more uniform flow of the gas across the plate and thereby reduce density variation in the solids on the plate. Higher gas and solids rates are possible when using baffles. In addition to improving operability, the baffles also improve the efficiency of contacting, not only because of more uniform mixing of gas and solids, but because of a staging effect as the solids move across the plate without appreciable back mixing across the baffles.

The nature and operating characteristics of the apparatus according to this invention have been described without specific reference to any particular process, as the indicated concepts apply equally to all systems in which fluidized, finely divided solid materials may be contacted with a gaseous material in substantially the manner set forth. Such systems or processes may include those designed for the catalytic cracking of hydrocarbons, for the segregation of normally gaseous hydrocarbons such as ethane, from others, such as propane, butane and the like, wherein a finely divided selective adsorbent material such as activated carbon is employed.

What is claimed is:

1. Apparatus for contacting finely divided, fluidized, solid materials and a gaseous material, comprising in combination, a contacting chamber having a floor plate, inlet conduit means for fluidized solid materials, having a discharge end opening into said chamber in vertically spaced relation to said floor plate, outlet conduit means for solid materials, said means extending downwardly through said floor plate, and having an entrance end opening from said chamber at a level above the plate and the inlet conduit discharge end, said inlet and outlet conduit means being disposed in opposed relationship diametrically of said chamber, and defining opposite ends of a flow path for a layer of fluidized solids laterally across said plate, separate means for passing a gaseous material upwardly through said floor plate and a layer of fluidized solid material thereon, and for removing gaseous materials from said chamber above said layer, and a series of planar baffle plate members disposed transversely of the chamber across the material flow path between said inlet and outlet conduits in which series said members extend transversely of said flow path in substantially parallel spaced relation to each other longitudinally of said path, with all of said baffle plate members disposed substantially within a zone defined vertically upwardly from the lower end of said inlet conduit to the upper end of said outlet conduit.

2. An apparatus according to claim 1, in which said baffle members are disposed as a series of offset rows of members of which each row is offset with respect to a row below it in the direction of the entrance end of said outlet conduit means.

3. An apparatus according to claim 1 including support means for each of said baffle plate members comprising a rotatable shaft support secured to and substantially coextensive with each of said baffle plate members and means for arcuately rotating said shaft.

References Cited in the file of this patent

UNITED STATES PATENTS

| Number | Name | Date |
|---|---|---|
| 2,316,664 | Brassert et al. | Apr. 13, 1943 |
| 2,367,694 | Snuggs | Jan. 23, 1945 |
| 2,433,798 | Voorhees | Dec. 30, 1947 |
| 2,582,688 | Ford | Jan. 15, 1952 |
| 2,586,818 | Harms | Feb. 26, 1952 |
| 2,637,915 | Weiss | May 12, 1953 |
| 2,641,849 | Lintz | June 16, 1953 |

FOREIGN PATENTS

| 644,138 | Great Britain | Oct. 4, 1950 |